United States Patent
Shambu Panneer Selvam et al.

(10) Patent No.: US 11,788,847 B2
(45) Date of Patent: Oct. 17, 2023

(54) CONCURRENT VISUALIZATION OF MULTIPLE TRANSPORTATION PLANS

(71) Applicant: Oracle International Corporation, Redwood Shores, CA (US)

(72) Inventors: Sakti Kumar Shambu Panneer Selvam, Chester Springs, PA (US); Sundararajan Arunapuram, West Chester, PA (US); Aparna Urukonda, Bangalore (IN); Sushma Tellajeera, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 913 days.

(21) Appl. No.: 16/571,167

(22) Filed: Sep. 15, 2019

(65) Prior Publication Data

US 2021/0080266 A1    Mar. 18, 2021

(51) Int. Cl.
*G01C 21/34* (2006.01)
*G06Q 10/0835* (2023.01)
*G01C 21/36* (2006.01)

(52) U.S. Cl.
CPC ......... *G01C 21/34* (2013.01); *G01C 21/3667* (2013.01); *G06Q 10/08355* (2013.01)

(58) Field of Classification Search
CPC ............... G01C 21/34; G01C 21/3667; G06Q 10/08355
See application file for complete search history.

(56) References Cited

U.S. PATENT DOCUMENTS

| | | | |
|---|---|---|---|
| 11,144,868 B1* | 10/2021 | McBride | G06Q 10/0834 |
| 2007/0016363 A1* | 1/2007 | Huang | G08G 1/202 |
| | | | 701/533 |
| 2013/0219334 A1* | 8/2013 | Campbell | G06F 3/048 |
| | | | 715/810 |
| 2014/0063020 A1* | 3/2014 | Den Herder | G06T 11/206 |
| | | | 345/441 |

OTHER PUBLICATIONS

Zheng, Changwen; Lei Li, Fanjiang Xu, Fuchun Sun and Mingyue Ding, "Evolutionary route planner for unmanned air vehicles," in IEEE Transactions on Robotics, vol. 21, No. 4, pp. 609-620, Aug. 2005, doi: 10.1109/TRO.2005.844684. (Year: 2005).*

* cited by examiner

*Primary Examiner* — Jeff Zimmerman
*Assistant Examiner* — Wayne S. Murray
(74) *Attorney, Agent, or Firm* — Invoke (57) ABSTRACT

The embodiments disclosed herein relate to concurrently displaying maps visualizing different subsets of transportation planning data. The concurrently displayed maps are automatically updated based on changes to the transportation planning data. A map locking functionality prevents the locked map from being updated based on changes to the transportation planning data. Other non-locked maps continue to be updated based on the changes to the transportation planning data. The map locking functionality allows for visualizing and comparing different states of the transportation planning data.

20 Claims, 4 Drawing Sheets

CONCURRENT VISUALIZATION OF MULTIPLE TRANSPORTATION PLANS

TECHNICAL FIELD

The present disclosure relates to computerized logistics. Specifically, the disclosure relates to a computing program that enables the concurrent visualization of multiple transportation plans.

BACKGROUND

A transportation plan for an order specifies details for transporting goods from a source location to a destination location. A transportation plan may include one or more transportation segments. The transportation plan may include a route for each segment to transport goods from the source location to the destination location. As an example, a transportation plan may specify three transportation segments: (a) a trucking company to transport the goods from Santa Clara, Calif. to the San Jose, Calif. airport, (b) an air freight company to transport the package from San Jose Airport to Logan Airport in Boston, Mass., and (c) a courier to pick up the goods at Logan Airport and deliver the goods to the destination address in Amesbury. The cost associated with the transportation plan may be an aggregate of the cost for each segment.

Visualizing a transportation plan via a Graphical User Interface (GUI) is advantageous for a user to understand details of the transportation plan. A visualization of a transportation plan may include information about one or more transportation segments corresponding to the transportation plan.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. INTRODUCTION
2. GENERAL OVERVIEW
3. TRANSPORTATION PLANNING SYSTEM
4. CONCURRENTLY DISPLAYING MULTIPLE MAPS DERIVED FROM SUBSETS OF THE SAME TRANSPORTATION PLANNING DATA
5. EXAMPLE EMBODIMENTS
6. COMPUTER NETWORKS AND CLOUD NETWORKS
7. HARDWARE OVERVIEW

1. Introduction

A person or company may create an order that requests the transport of goods. An order may include constraints on the transport of the goods. As an example, the order may require a particular transport type (e.g., barge, truck, train, air, bus etc.), latest arrival date, maximum cost, or a particular transport provider. A transportation plan specifies how to transport goods from a source location to a destination location. The transportation plan for an order may be determined based on the constraints corresponding to the order. Additionally, the transportation plan for an order may be determined based on additional user-specified constraints for determining the transportation plan. In an example, a planner may generate multiple transportation plans based respectively on the services provided by multiple transport providers. Different transportation plans for the same order may be determined using the same transport provider or different transport providers.

2. General Overview

One or more embodiments concurrently display multiple maps that visualize transportation planning data. Each map is configured to visualize a respective subset of transportation planning data. Visualizations of particular transportation plans in each of the multiple concurrently displayed maps are derived from subsets of the same underlying transportation planning data. Each map may be individually configurable to visualize certain types of information from the underlying transportation planning data. Each map may display information in different manners or formats. A map may be configured to only display information corresponding to transportation segments with certain attributes. As an example, a particular display may be configured to display one or more of: (a) transportation segments corresponding to a specific order, (b) transportation segments corresponding to a particular type of transport, or (c) transportation segments in any transportation plan by a particular vendor.

One or more embodiments automatically update concurrently displayed maps. The system updates a map in response to detecting that a subset of the underlying transportation planning data represented by that map has been updated. As an example, the system updates a map visualizing components (e.g., route and transport type) of a transportation plan upon detecting that the visualized components of the transportation plan have been updated. Multiple concurrently displayed maps, that are derived at least in part from a same shared subset of the underlying dataset, may all be updated in response to a single change in that shared subset of the underlying dataset. Alternatively, a change in a subset x of the underlying dataset may result in an update to one map that represents the subset x of the underlying dataset. The change in the subset x of the underlying dataset may not result in an update to another that map that does not represent the subset x of the underlying dataset. Side-by-side automatically updating maps allow a user to easily compare attributes of various transportation plans and order combinations.

In an example, a maximum budget for an order is lowered. The subset, of the transportation plans previously determined for the order, that exceed the newly specified maximum budget are re-computed. A route with toll roads as specified in a transportation plan may be updated to a different route without toll roads to reduce the total cost of the transportation plan such that the total cost is below the newly specified budget. Alternatively or in addition, an overnight shipping option specified in a transportation plan may be changed to two-day shipping to lower the overall cost of the transportation plan. Once the subset of transportation plans affected by the new maximum budget are re-computed, the corresponding visualizations of the subset of transportation plans are updated in the maps.

One or more embodiments "lock" a subset of the concurrently displayed maps without locking another subset of the concurrently displayed maps. A map "lock" prevents the map from being automatically updated in response to a modification to an order or transportation plan corresponding to the locked map. Subsequent to generating multiple maps that visualize transportation plans for an initial set of orders, a first map may be "locked". Thereafter, the initial set of orders may be modified via addition, deletion, or modification of at least one order. The updated set of orders does not trigger any updates to the locked map even though the locked map represents an order that has been deleted or modified. The updated set of orders triggers an update to a second map that is not locked. The concurrently displayed maps then include the first map based on the initial set of orders and the second map based on the updated set of orders. The concurrently displayed maps thus allow for concurrently visualizing transportation maps corresponding to different states of a set of orders.

3. Transportation Planning System

Figure 1:
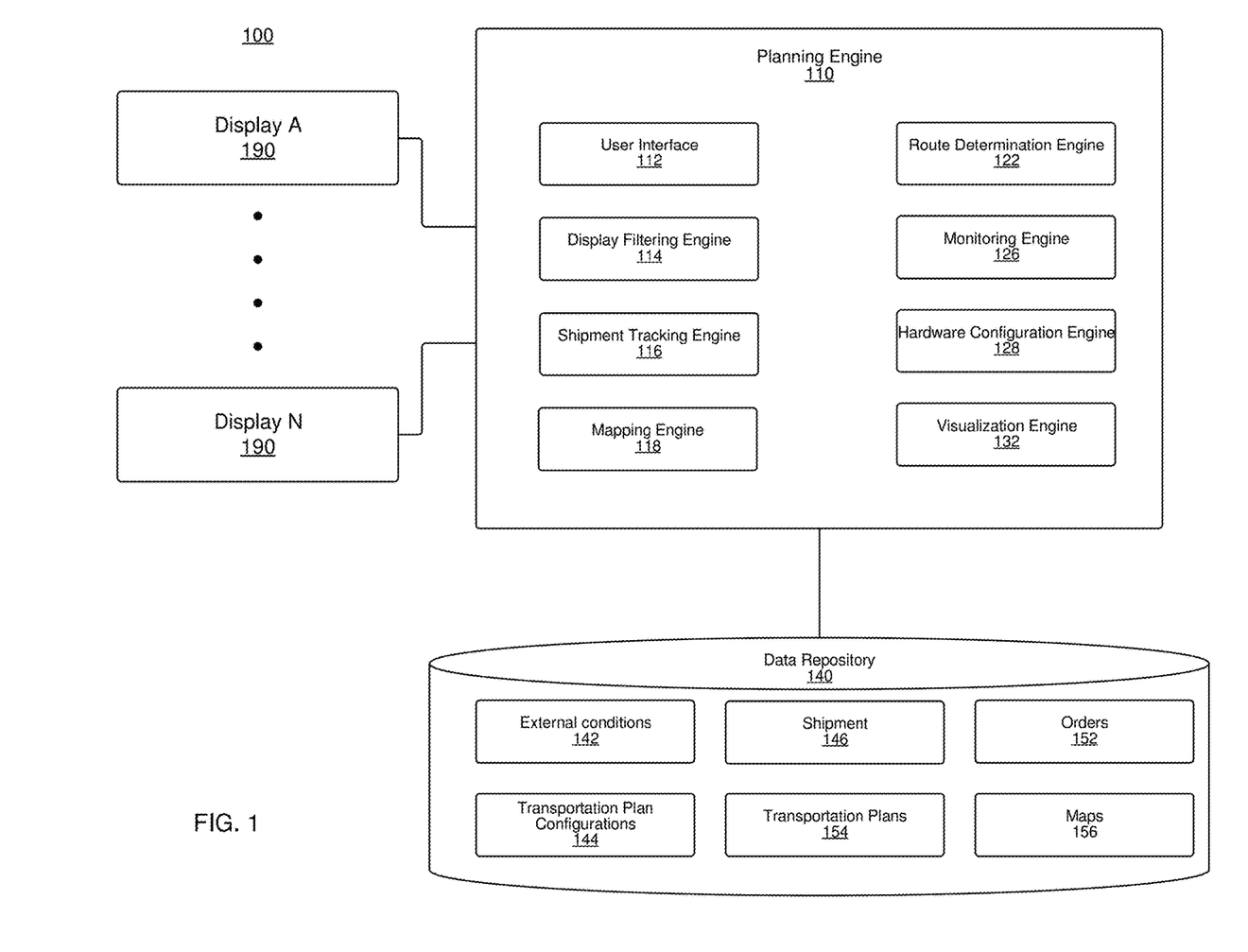
FIG. 1 is a block diagram that illustrates components of a transportation planning system, in accordance with one or more embodiments.

FIG. 1 illustrates a transportation planning system 100 in accordance with one or more embodiments. As illustrated in FIG. 1, the transportation planning system 100 includes a planning engine 110, a data repository 140, and one or more displays 190. In one or more embodiments, the transportation planning system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In one or more embodiments, a data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or may execute on the same computing system as one or more other components of the transportation planning system 100. Alternatively or additionally, a data repository 140 may be implemented or executed on a computing system separate from one or more other components of the transportation planning system 100. A data repository 140 may be communicatively coupled to one or more other components of the transportation planning system 100 via a direct connection or via a network.

In an embodiment, a data repository 140 stores orders 152. Orders 152 are purchase requests for the purchase of transport services. A transport service transports goods from one location to another location. An order may specify attributes of the goods to be transported. Attributes of goods may include, for example, the type of goods, the size of goods, the weight of goods, the volume of goods, the cost of goods, and whether or not the goods are fragile. An order may specify one or more constraints regarding the transportation of the goods. Transportation constraints may include, for example, a deadline for completing transportation, a maximum cost of the transportation, a transportation vendor, a type of transport (e.g., air, rail, truck, ship), and whether refrigeration is required. The type of goods specified in the order may result in system-determination of transportation constraints. As examples, goods that are (a) fragile require special handling, (b) valuable require insurance and tracking, (c) hazardous require transport that allows hazardous materials, or (d) perishable require freezing or refrigeration during transport.

In an embodiment, a data repository stores transportation plans 154. A transportation plans 154 specifies how to transport goods, specified in an order, from a source location to a destination location. The transportation plan 154 for an order may be determined based on the constraints specified by the order. Additionally, the transportation plan 154 for an order may be determined based on additional constraints specified for determining a particular transportation plan 154. A transportation plan configuration 144 includes a set of one or more constraints used to compute the transportation plan. Multiple stored transportation plan configurations can be used for generation of transportation plans that are concurrently displayed on maps.

In an example, an order does not specify a transport provider thereby allowing a planner to select any service provider. Different transportation plans 154 for the same order may be determined based on different corresponding transport providers. In another example, different transportation plans are based on different transport types.

A transportation plan 154 for transporting goods from a source location to a destination location may include one or more transportation segments. Each transportation segment is associated with a corresponding route that is taken for transporting goods. Different routes may be defined by a same map vendor or by different map vendors using a respective set of constraints for the route.

As an example, a transportation plan for an order may specify three transportation segments to transport goods: (a) warehouse in Santa Clara, Calif. to the San Jose, Calif. airport, (b) San Jose Airport to Logan Airport in Boston, Mass., and (c) Logan Airport to a store in Amesbury. Each transportation segment, for a particular transportation plan, may be completed by a shipment 146 along the corresponding route. A shipment 146 may be associated with one or more of: a corresponding transportation type (e.g., transportation over roads, rail, air, and water), a transportation provider (e.g., FedEx, UPS, Joe's Truck Company, and Speedy Air Travel), an estimated transport time, and an estimated risk factor. A single shipment may include goods from multiple orders, and thereby be associated with multiple transportation plans 154.

In an embodiment, a data repository 140 stores current external conditions 142 or expected external conditions 142 at a particular time. External conditions 142 include any conditions external to the planning system that are used to compute transportation plans 154. External conditions 142 may include route conditions such as traffic information, weather information, construction information, road closures, toll costs, estimated time for completing routes. External conditions 142 may include transport provider information such as availability of transport providers, costs of transport providers, and approval rating of transport providers. A system may recompute transportation plans in response to detecting changes in external conditions 142.

In an embodiment, a planning engine 110 computes and visualizes transportation plans 154 for orders 152. Planning engine 110 may include one or more of: user interface 112, transportation plan filtering engine 114, shipment tracking engine 116, mapping engine 118, route determination engine 122, route filtering engine 124, delay detection engine 126, hardware determination engine 128, and visualization engine 132, and other components that may not be explicitly illustrated here.

User interface 112 is an interface for obtaining information from a user and presenting information to a user. User interface 112 may detect user input initiating a process for computing a transportation plan. In an embodiment, the user interface 112 may allow a user to enter/edit/delete orders, specify order constraints, specify transportation plan configurations, enter or change rate offerings, view, analyze, and compare various transportation plans created for orders. One or more potential layouts of user interface 112 will be discussed in more detail below with respect to FIG. 3.

Display filtering engine 114 may include functionality to select subsets of transportation planning data to be visualized in any particular map. As examples, display filtering engine 114 may limit visualization of transportation planning data to include data that corresponds (a) a particular set of orders, (b) a particular transport provider, (c) a particular type of transport, and/or (d) transport within a particular time period.

Shipment tracking engine 116 may be used to track real-time locations of vehicles carrying orders. Shipment tracking engine 116 can receive signals from GPS transceivers located in or near shipments being tracked.

Mapping engine 118 may be used to display the maps on the one or more displays 190. Mapping engine 118 may use data from map providers 146 as well as data being tracked by shipment tracking engine 116 to create one or more maps for display. Mapping engine 118 may also display additional data such as route conditions 142, itineraries 148, and orders 152.

Route determination engine 122 may be used to calculate a route to be used for a transportation plan. The route determination engine 122 may obtain routes from one or more 3$^{rd}$ party map providers. Alternatively, or in addition, route determination engine 122 may use information from other engines in planning engine 110 and data from one or more data repositories within data repository 140 to calculate routes used for a transportation plan.

Monitoring engine 126 may be used to detect external conditions 142 and changes thereof. Monitoring engine 126 may subscribe, for example, to changes in route conditions, news events related to road delays/closures and strikes by employees of transport providers, and changes in rates/offerings of transport providers. Monitoring engine 126 may trigger the re-computation of transportation plans 154.

Hardware configuration engine 128 may be used to determine a hardware configuration of a user. Hardware configuration can include the visual capabilities of the user's computer. Visual capabilities include a range of available resolution that can be displayed on the user's computer and the number of displays 190 of the user's computer.

Visualization engine 132 may include functionality to determine visualization parameters. For example, visualization engine 132 may determine a map configuration such as a number of maps to be displayed, a size of maps to be displayed, and a resolution for the maps being displayed. The visualization engine 132 may also assign visualizations across the different maps. The visualization engine 132 may receive map configurations from a user, use a default map configuration, or select a map configuration based on the transportation plans that are to be displayed.

Figure 2:
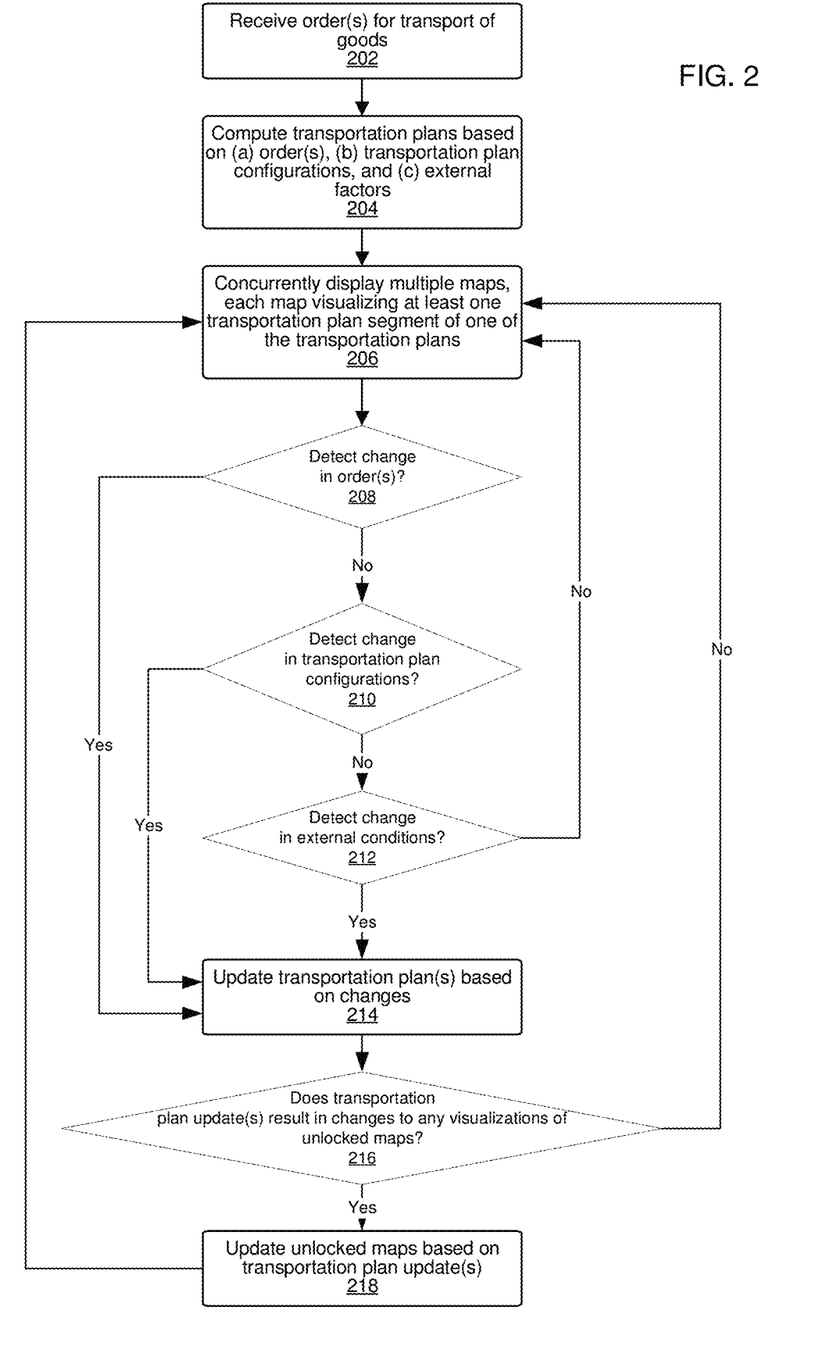
FIG. 2 is a flow diagram for concurrently displaying multiple maps derived from different subsets of the same transportation planning data.

4. Concurrently Displaying Multiple Maps Derived from Transportation Planning Data FIG. 2 illustrates an example set of operations for concurrently displaying multiple maps derived from transportation planning data in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, the system receives an order(s) for the transport of goods (Operation 202). Receiving an order includes receiving one or more parameters of an order that are used for computing a transportation plan for the order. An order may be received from a user via a Graphical User Interface (GUI). An order may be received from a separately implemented, ordering system (not shown).

The system generates transportation planning data including generating a set of transportation plans. The set of transportation plans are based on order(s), transportation plan configurations, and external factors (Operation 204). Generating a transportation plan includes selecting one or more attributes of a transportation plan in accordance with constraints defined by a corresponding order and constraints defined for that transportation plan. A set of attributes may be selected for each respective transportation segment within the transportation plan. Generating a transportation plan may include, for example, selecting a transport type, a transport vendor, a transport time frame, and a transport route.

Services of different transportation providers may be needed for respective transportation segments. In an example, some transportation providers only provide short distance transportation services, such as from a rail yard to a warehouse. The short distance transportation services can be combined with long-distance transportation services via long-haul trucks, rails, and air.

As an example, an order may define a maximum cost for transportation. Transportation providers with costs that exceed the maximum cost will not be considered. The order may have time constraints. Thus, any transportation provider that would exceed the maximum time allowed would not be considered. In some instances, an order may contain a restrictions on transportation providers, such as avoiding certain transportation providers or requirements to use a particular transportation providers. This may be true in an instance when a particular supplier has a contract or arrangement with certain transportation providers. The order attributes may include preferred transportation types (e.g., rail vs truck vs air). The order attributes may include limitations on roads taken (e.g., avoiding toll roads, or requiring Hazmat acceptable roads). The order attributes may include external factors, such as an average time associated with various routes, service provider fees, and conditions specific to certain transportation providers (such as the existence of a strike), and other risk-related factors.

In an embodiment, the system concurrently displays multiple maps such that each map visualizes at least one transportation plan segment of one of the transportation plans. (Operation 206). A graphical user interface element (such as a radio button, drop down box, check box) or a previously set user interface preference can be used to select which subsets of the transportation planning data are to be visualized. Examples of transportation planning data to be visualized can include, for example, the visualization of all transportation plans determined for a particular order(s) of the orders in the system, the visualization of all transportation plan segments with a particular vendor, the visualization of all transportation plan segments with a particular transport type such as rail, the visualization of all transportation segments that are at risk of delay, and the like). In some embodiments, the system may select which subset of the transportation planning data is to be visualized in which map. The hardware configuration of the system is taken into account when the system selects which subsets of the transportation planning data is to be visualized in which map. For example, the number of monitors or other graphics capabilities of the system can be determined and used to determine the size of the map being displayed. The size of the map being displayed can be used to determine which data is to be visualized on each map. Alternatively, a user may specify the subset of transportation planning data to be visualized in each map.

In an embodiment, the system selects transportation planning data to be visualized in the concurrently displayed maps based on a requested comparison. The system may, for example, receive a request to compare routes taken by different vendors. Based on the request, the system may generate transportation plans for each of the different vendors, including a route taken by each vendor. The system visualizes each transportation plan in a respective map of the set of concurrently displayed maps. In another example, the system may receive a request to compare costs and timelines corresponding to various types of transports offered by a particular vendor. The system may first identify the candidate set of transports that are suitable for the transport. The system generates transportation plan based on a respective transport type of the candidate set of transports. Each of the transportation plans are then visualized in respective maps. Each visualization may include the corresponding route overlaid with time and cost information.

In an embodiment, the system determines whether any order has been changed (Operation 208). The system may detect an order update via a push notification. An order update may be received from an external system that tracks or maintains orders. An order update may be received via manual input into the system through the use of a graphical user interface. The system may detect an order update via a pull mechanism. The system may periodically retrieve attributes of an order in an order system and compare the retrieved attributes to stored attributes. If a mismatch is found, the order may be determined to be updated.

In an embodiment, the system determines whether any transportation plan configurations have been changed (Operation 210). The system may detect a transportation plan configuration change via a push notification. A transportation plan configuration change may be received from an external system that tracks or maintains transportation plan configurations. A transportation plan configuration change may be received via manual input into the system through the use of a graphical user interface. The system may detect a transportation plan configuration change via a pull mechanism. The system may periodically retrieve attributes of a transportation plan configuration and compare the retrieved attributes to stored attributes. If a mismatch is found, the transportation plan configuration change may be detected.

In an embodiment, the system detects a change in external conditions used to compute transportation plans (Operation 212). The system may subscribe to a variety of informational sources to detect changes in external conditions that are used to compute transportation plans. The system can use filtering criteria to determine whether news articles, press releases, or other web pages describe modifications to external conditions that being used to compute transportation plans.

In operation 214, the system updates one or more transportation plan(s) based on changes detected in operations 208 to 212. For example, the system may detect that a certain road is closed, resulting in a delay for routes that pass near the road. A transportation plan that utilized that road may be re-calculated such that the road is no longer included in the transportation plan. In another example, an order indicates a change to the maximum cost allowed. In such a situation, the transportation plan may be re-routed to reduce mileage or avoid toll roads. In another example, an order may be changed to include extra material being transported. The extra material may result in a load being too large for certain types of trucks, thus changing the routes being calculated because larger trucks may not be allowed on certain roads.

The system determines if the update(s) to the transportation plan(s) result in changes to any visualizations of unlocked maps (Operation 216). If a visualization represents information from a transportation plan that has been changed, then a change is required for the visualization. It should be noted that not all changes to a transportation plan result in an update to visualization of a map. As an example, a map may not be configured to indicate the vendor for each segment of a transportation plan. If the change in transportation plan is simply a change in vendor, this will not result in any change to the visualization. As another example, a map may only visualize the transport via rail. In this case, a change in the transportation segments by truck will not change the map. As describe above, in some embodiments, some maps can be "locked" such that changes to transportation plans do not affect the visualization of the map. While such a feature may be optional, it may be noted that operation 216 only applies to maps that are not locked.

In an embodiment, the system updates unlocked maps based on transportation plan update(s) (Operation 218). As an example, the system may detect a change in a route that is visualized in an unlocked map. Responsive to detecting the change in the route, the system updates the route in the unlocked map. In another example, multiple transportation plans have been computed for an order and visualized via a respective map in a set of concurrently displayed maps. A single change to the order includes a significant reduction in product quantity to be shipped. The change in quantity triggers the selection of new vendors that are suitable for the smaller quantity. New routes computed for the new vendors are reflected in the updated transportation plans. The system then updates the concurrently displayed maps to reflect the updated transportation plans. Accordingly, the system updates multiple maps in response to a single change in an order.

5. Example Embodiments

Figure 3:
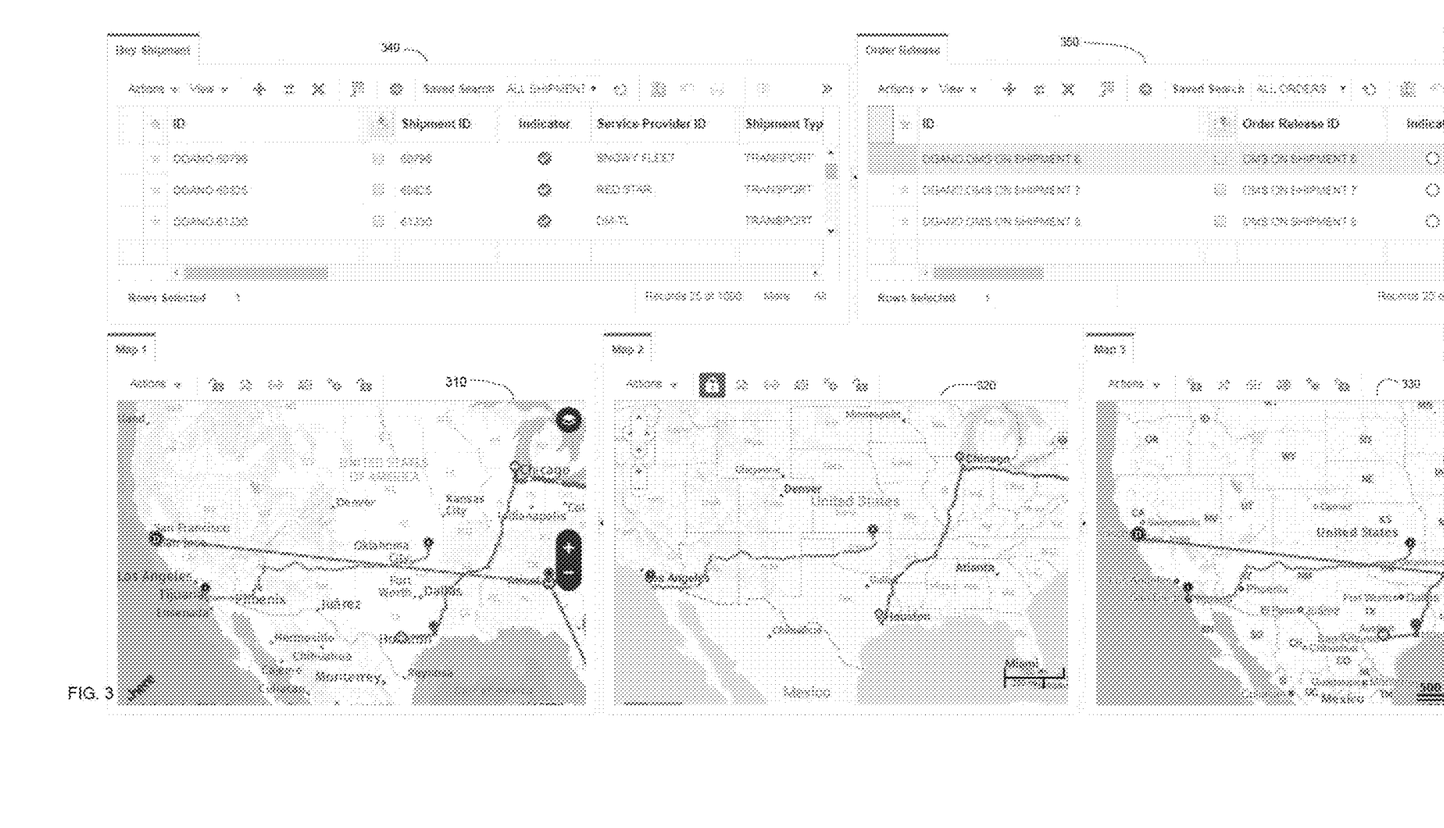
FIG. 3 illustrates an example user interface of one or more embodiments.

With reference to FIG. 3, an example screenshot 300 is presented illustrating an example user interface of one or more embodiments. Screenshot 300 contains three maps 310, 320, and 330. Although three maps are illustrated in FIG. 3, it should be understood that a number other than three can be included in one or more embodiments. For example, two, or four maps, can be shown in some embodiments. There may be an upper limit to the number of maps that are displayable, as screen real estate may run out once a certain number of maps is reached. In some embodiments, that limit may be set at five maps. In some embodiments, the maximum number of maps can be configurable by a user. This could be useful for users with different screen sizes.

Also shown in screenshot 300 are a data area 340 and a data area 350. Data area 340 and 350 enable a user to select what is displayed on maps 310, 320, or 330. For example, data area 340 and 350 can enable a user to select orders or shipments to be displayed on maps 310, 320, and 330. As illustrated in FIG. 3, several orders may be displayed to the user. The user may be able to select orders or shipments to be displayed on one or more of maps 310, 320, or 330. Additional information may be displayed regarding each order, to enable the user to more effectively choose which order to be displayed.

In some embodiments, an order defines a source location and a destination location for a specific set of goods. A shipment can be created that includes one or more orders. One or more embodiments allow a user to group one or more orders into shipments. Using the displayed maps (such as maps 310, 320, and 330), allows a user to visualize existing orders, giving the user the ability to place an order in a shipment in a way that optimizes various criteria the user might wish. For example, a user may see an order that has a source of Phoenix, Ariz. and a destination of San Antonio, Tex. The user may then note that there is already a shipment that has room for more cargo that travels from Los Angeles, Calif. to Houston, Tex. Therefore, the order from Phoenix to San Antonio can be placed on the shipment from Los Angeles to Houston without requiring the shipment to deviate significantly from the already planned route.

In certain instances, the addition of an order may involve more significant re-routing of a shipment. For example, there may be an order with a source of Phoenix, Ariz. and a destination of Memphis, Tenn. There may be two shipments that are close to the order. There may be a first shipment from San Diego, Calif. to Atlanta, Ga. and a second shipment of Las Vegas to Louisville, Ky. The user could view the first shipment on map 310 and the second shipment on map 320. The user could then add the order to the first shipment to see how the first shipment will be changed with the addition of the order. The user could then add the order to the second shipment to see how the second shipment will be changed with the addition of the order. In both cases, the maps 310 and 320 can be updated in real-time to graphically show the effects on the shipments. There may also be information placed in data areas 340 and 350 that is relevant to the maps being shown. The information may be relevant to each order or shipment. For example, a user can add an order to a shipment and see the effect on delivery time and the effect on cost be displayed in data areas 340 and 350.

Data areas 340 and 350 can be used both to display data and to give the user the ability to select data. Data areas 340 and 350 can enable a user to select a different map provider (also known as a map vendor) for each of maps 310, 320, and 330. Different map providers may have different routing data. For example, one map provider may have different sources for information such as road closures, traffic, and the like than another map provider. One map provider may provide real-time traffic information from a different source from another map provider. Different map providers may use different algorithms to calculate routes. Thus, a user could select different map providers as a way of comparing two or more routes.

The data being displayed in data areas 340 and 350 can be configurable. FIG. 3 shows one possible configuration. Data area 340 is being used to show various shipments available for viewing and/or modification. Various information is shown for each shipment, such as the transportation company being used and the shipment type (e.g., flatbed truck, refrigerated truck, rail, air, and the like). The user is able to select each shipment to enable the shipment to be viewed on one or more of maps 310, 320, or 330.

In some embodiments, the maps 310, 320, or 330 can be selected such that each map shows the same shipment, but with a different map provider. The maps can then be synced such that a change to one shipment (such as adding or changing a destination) is reflected in each map, but with the different map providers possibly showing different routes because each map provider may calculate each route differently.

In some embodiments, the maps 310, 320, or 330 can be selected such that each map shows the same shipment, but with a different routing configuration. In some instances, the different routing configuration can include the use of a different map provider. In some instances, the different routing configuration can include different options used to calculate a route.

In the alternative, each of maps 310, 320, and 330 can show a different shipment. For example, the user can view an existing shipment on map 310, then view what changes occur to the shipment if the user adds an order on map 320. In the alternative, a completely different shipment could be viewed on each of maps 310, 320, and 330. Such a view may be useful for a user to determine what shipments are currently outstanding.

Another use case can have a user comparing different modes of transportation for a shipment. Using the data areas 340 and 350, the user can input parameters and view the results in one or more of maps 310, 320, and 330. For example, a particular shipment (including one or more orders) may be all the way across country, such as Seattle, Wash. to Miami, Fla., with one or more stops in between. Because of the long distance involved (over 3000 miles), sending the shipment using trucks and roads might be too time consuming. So the user can compare the prices and time involved sending the shipment by truck (with the map being displayed in map 310), sending the shipment at least partially by air (with the map being displayed in map 320), and sending the shipment at least partially by rail (with the map being displayed in map 330). The user may end up sending the shipment by air to Atlanta, Ga., with a truck finishing the trip to Miami, Fla., making other deliveries along the way.

The different modes of transportation discussed above may include different transportation companies. The user may wish to compare the rates and time involved in sending the same shipment via different transportation companies. The different modes of transportation can include different levels of shipping of the same transportation company. For example, a transportation company may have different rates and times for sending a small order compared to combining several small orders into a larger shipment. A user can place the various rates and times on different maps for planning purposes.

In some embodiments, the maps 310, 320, and 330 can be updated in real-time. Transportation companies may have the capability to track a location of their trucks, airplanes, and rail cars, using technology such as global positioning system (GPS) and other global navigation satellite systems. One or more embodiments have the capability to receive the location signals from the transportation companies and display the location, either in text form in data areas 340 and 350, or graphically on maps 310, 320, and 330.

In some embodiments, the maps 310, 320, and 330 can include historical information. For example, if there is a regular shipment, a user is able to look at previously made shipments and compare them to currently running shipments. The user can place the historical shipments on the same map (such as one of map 310, 320, or 330) as a current shipment or separate maps can be used for individual historical shipments. In such a manner, a user can track how long previous shipments took for delivery or how much a shipment cost, and compare that data to data for a current or planned shipment.

Transportation companies often have the capability to track a location of their trucks, airplanes, and rail cars, using technology such as global positioning system (GPS) and other global navigation satellite systems. One or more embodiments have the capability to receive the location signals from the transportation companies and display the location, either in text form in data areas 340 and 350, or graphically on maps 310, 320, and 330.

The display of real-time location information can allow a user to add orders to shipments that are already on route to a destination. If a user becomes aware of an order, the user can track existing shipments to determine if there are any shipments that are close to the source of the order and has sufficient room to add the order to the shipment. The user also can use the real-time location information to track shipments to ensure that the shipments will be made on time. The user also could re-route existing shipments based on many different criteria, such as prioritizing certain shipments, re-routing around traffic incidents, and the like.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is labeled with a tenant ID. A tenant is permitted access to a particular network resource only if the tenant and the particular network resources are associated with a same tenant ID.

In an embodiment, each tenant is associated with a tenant ID. Each application, implemented by the computer network, is labeled with a tenant ID. Additionally or alternatively, each data structure and/or dataset, stored by the computer network, is labeled with a tenant ID. A tenant is permitted access to a particular application, data structure, and/or dataset only if the tenant and the particular application, data structure, and/or dataset are associated with a same tenant ID.

As an example, each data repository implemented by a multi-tenant computer network may be labeled with a tenant ID. Only a tenant associated with the corresponding tenant ID may access data of a particular data repository. As another example, each entry in a data repository implemented by a multi-tenant computer network may be labeled with a tenant ID. Only a tenant associated with the corresponding tenant ID may access data of a particular entry. However, the data repository may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
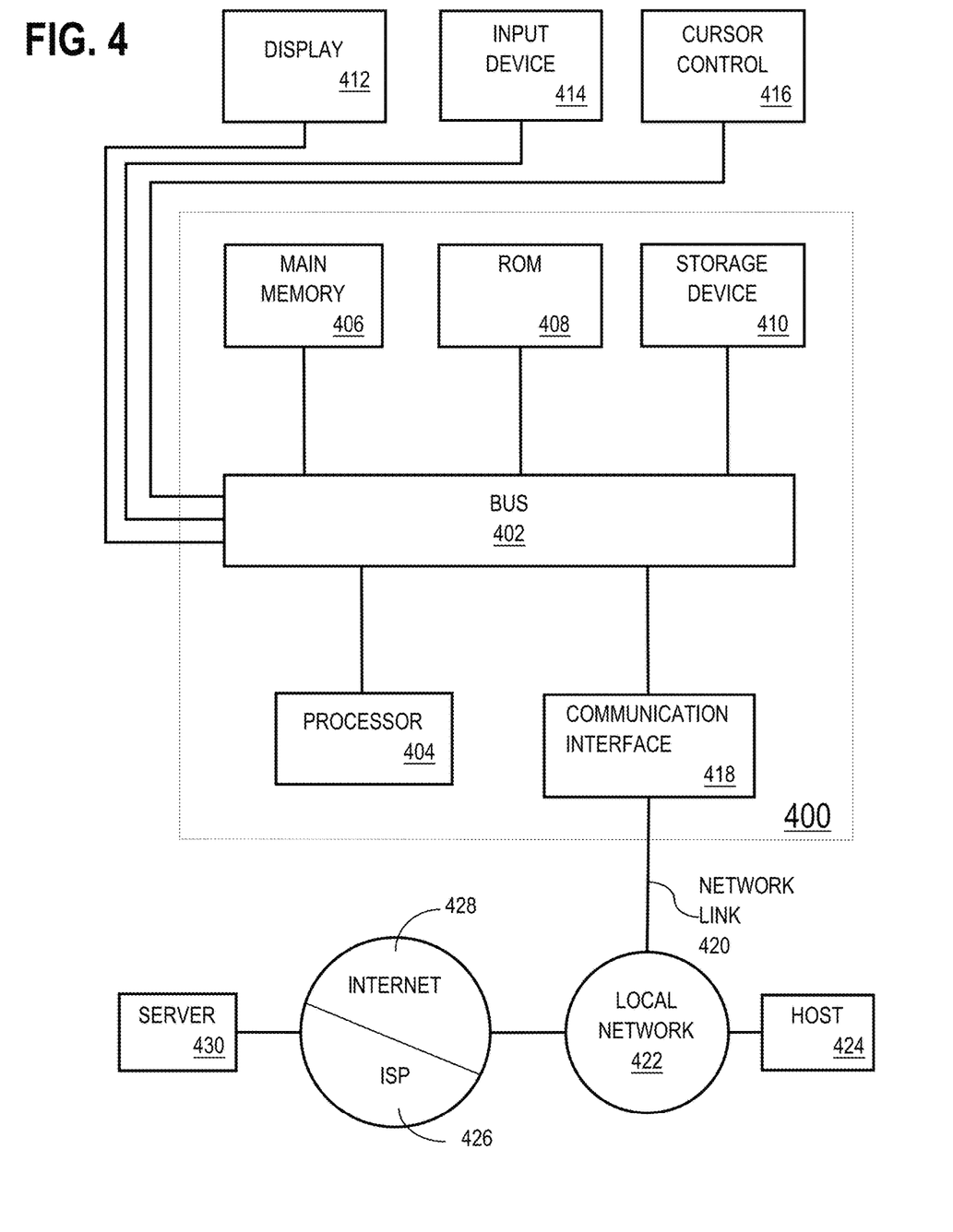
FIG. 4 shows a block diagram that illustrates a computer system, in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
generating transportation planning data comprising a plurality of transportation plans corresponding to the transport of goods for one or more orders;
concurrently displaying a plurality of maps visualizing at least a portion of the transportation planning data,
wherein a first map, of the plurality of maps, is derived from a first subset of the transportation planning data and a second subset of the transportation planning data;
wherein a second map, of the plurality of maps, is derived from the first subset of transportation planning data, but not the second subset of transportation planning data;
wherein the first map displays a first set of one or more transportation plans of the plurality of transportation plans,
wherein the second map displays a second set of one or more transportation plans of the plurality of transportation plans, and
wherein the first set of transportation plans is different than the second set of transportation plans;
responsive to detecting a first change in first subset of transportation planning data: updating both the first map and the second map based on the change in the first subset of transportation planning data; and
responsive to detecting a second change in the second subset of transportation planning data: updating the first map based on the change in the second subset of transportation planning data without updating the second map.

2. The one or more non-transitory computer readable media of claim 1,
wherein the first map visualizes a first transportation plan and a second transportation plan,
wherein the second map visualizes the first transportation plan and a third transportation plan without visualizing the second transportation plan,
wherein the change in the first subset of transportation planning data comprises a change to the first transportation plan, and
wherein the change the second subset of transportation planning data comprises a change to the second transportation plan.

3. The medium of claim 1, wherein the change in the first subset of transportation planning data is determined responsive to receiving user input comprising an update to the one or more orders.

4. The medium of claim 1, wherein the operations further comprise:
locking the first map to prevent updates to the first map based on updates to the transportation planning data, without locking the second map;
responsive to detecting a third change in the first subset of transportation planning data: updating the second map based on the change in the first subset of transportation planning data, without updating the locked first map.

5. The medium of claim 1,
wherein the first map comprises a first route included in (a) a first transportation plan for transportation of a first set of goods corresponding to a first order, and (b) a second transportation plan for a second set of goods corresponding to a second order;
wherein the second map comprises a second route included in (c) a third transportation plan for transportation of the first set of goods corresponding to the first order, wherein the third transportation plan is an alternate to the first transportation plan for transporting the first set of goods.

6. The medium of claim 1, wherein the detecting operations and the updating operations are executed while the first map and the second map are concurrently displayed.

7. The medium of claim 1, wherein the first user input specifies a shipment from the source location to the destination location.

8. The medium of claim 1, further comprising concurrently displaying current location information overlaid on the first map and current location information overlaid on the second map.

9. The medium of claim 1, wherein the operations further comprise:
determining a number of hardware monitors available for display; and
distributing, for display, the plurality of maps across the number of hardware monitors available for display.

10. A method comprising:
generating transportation planning data comprising a plurality of transportation plans corresponding to the transport of goods for one or more orders;
concurrently displaying a plurality of maps visualizing at least a portion of the transportation planning data,
wherein a first map, of the plurality of maps, is derived from a first subset of the transportation planning data and a second subset of the transportation planning data;
wherein a second map, of the plurality of maps, is derived from the first subset of transportation planning data, but not the second subset of transportation planning data;
wherein the first map displays a first set of one or more transportation plans of the plurality of transportation plans,
wherein the second map displays a second set of one or more transportation plans of the plurality of transportation plans, and
wherein the first set of transportation plans is different than the second set of transportation plans;
responsive to detecting a first change in first subset of transportation planning data: updating both the first map and the second map based on the change in the first subset of transportation planning data; and
responsive to detecting a second change in the second subset of transportation planning data: updating the first map based on the change in the second subset of transportation planning data without updating the second map.

11. The method of claim 10,
wherein the first map visualizes a first transportation plan and a second transportation plan,
wherein the second map visualizes the first transportation plan and a third transportation plan without visualizing the second transportation plan,
wherein the change in the first subset of transportation planning data comprises a change to the first transportation plan, and wherein the change the second subset of transportation planning data comprises a change to the second transportation plan.

12. The method of claim 10, wherein the change in the first subset of transportation planning data is determined responsive to receiving user input comprising an update to the one or more orders.

13. The method of claim 10, further comprising:
locking the first map to prevent updates to the first map based on updates to the transportation planning data, without locking the second map;
responsive to detecting a third change in the first subset of transportation planning data: updating the second map based on the change in the first subset of transportation planning data, without updating the locked first map.

14. The method of claim 10,
wherein the first map comprises a first route included in (a) a first transportation plan for transportation of a first set of goods corresponding to a first order, and (b) a second transportation plan for a second set of goods corresponding to a second order;
wherein the second map comprises a second route included in (c) a third transportation plan for transportation of the first set of goods corresponding to the first order, wherein the third transportation plan is an alternate to the first transportation plan for transporting the first set of goods.

15. The method of claim 10, wherein the detecting operations and the updating operations are executed while the first map and the second map are concurrently displayed.

16. The method of claim 10, wherein the first user input specifies a shipment from the source location to the destination location.

17. The method of claim 10, further comprising concurrently displaying current location information overlaid on the first map and current location information overlaid on the second map.

18. The method of claim 10, further comprising:
determining a number of hardware monitors available for display; and
distributing, for display, the plurality of maps across the number of hardware monitors available for display.

19. A system comprising:
at least one hardware device including a processor; and
the system configured to perform operations comprising:
generating transportation planning data comprising a plurality of transportation plans corresponding to the transport of goods for one or more orders;
concurrently displaying a plurality of maps visualizing at least a portion of the transportation planning data,
wherein a first map, of the plurality of maps, is derived from a first subset of the transportation planning data and a second subset of the transportation planning data;
wherein a second map, of the plurality of maps, is derived from the first subset of transportation planning data, but not the second subset of transportation planning data;
wherein the first map displays a first set of one or more transportation plans of the plurality of transportation plans,
wherein the second map displays a second set of one or more transportation plans of the plurality of transportation plans, and
wherein the first set of transportation plans is different than the second set of transportation plans;
responsive to detecting a first change in first subset of transportation planning data: updating both the first map and the second map based on the change in the first subset of transportation planning data; and
responsive to detecting a second change in the second subset of transportation planning data: updating the first map based on the change in the second subset of transportation planning data without updating the second map.

20. The system of claim 19,
wherein the first map visualizes a first transportation plan and a second transportation plan,
wherein the second map visualizes the first transportation plan and a third transportation plan without visualizing the second transportation plan,
wherein the change in the first subset of transportation planning data comprises a change to the first transportation plan, and
wherein the change the second subset of transportation planning data comprises a change to the second transportation plan.

* * * * *

UNITED STATES PATENT AND TRADEMARK OFFICE
CERTIFICATE OF CORRECTION

PATENT NO. : 11,788,847 B2
APPLICATION NO. : 16/571167
DATED : October 17, 2023
INVENTOR(S) : Shambu Panneer Selvam et al.

It is certified that error appears in the above-identified patent and that said Letters Patent is hereby corrected as shown below:

In the Specification

In Column 7, Line 18, delete "like)." and insert -- like. --, therefor.

In the Claims

In Column 17, Line 49, in Claim 2, after "change" insert -- in --, therefor.

In Column 19, Line 1, in Claim 11, after "change" insert -- in --, therefor.

In Column 20, Line 41, in Claim 20, after "change" insert -- in --, therefor.

Signed and Sealed this
Twenty-fifth Day of June, 2024

Katherine Kelly Vidal
*Director of the United States Patent and Trademark Office*